(12) United States Patent  (10) Patent No.: US 8,059,163 B2
Rimon et al.  (45) Date of Patent: Nov. 15, 2011

(54) DIGITAL PHOTOGRAPHY USING ELECTRONIC IMAGE ANALYSIS TO IDENTIFY FACES OF FACES OF KNOWN SUBJECTS IN PREDETERMINED POSITION

(75) Inventors: Noam Rimon, Redwood City, CA (US); Sheng Dong, Fremont, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 570 days.

(21) Appl. No.: 11/846,481

(22) Filed: Aug. 28, 2007

(65) Prior Publication Data

US 2009/0059021 A1  Mar. 5, 2009

(51) Int. Cl.
*H04N 5/228* (2006.01)
(52) U.S. Cl. ............... 348/222.1; 348/208.14
(58) Field of Classification Search ......... 348/208.14, 348/222.1, 345
See application file for complete search history.

(56) References Cited

U.S. PATENT DOCUMENTS

| | | | |
|---|---|---|---|
| 6,913,439 B2 * | 7/2005 | Rutschmann et al. | 415/115 |
| 6,956,612 B2 * | 10/2005 | Bean et al. | 348/345 |
| 2004/0239777 A1 * | 12/2004 | Nakamura et al. | 348/239 |
| 2005/0024516 A1 * | 2/2005 | Fish et al. | 348/333.03 |
| 2006/0176392 A1 * | 8/2006 | Rainier et al. | 348/376 |
| 2007/0127786 A1 * | 6/2007 | Hiraizumi et al. | 382/118 |

OTHER PUBLICATIONS

Cell Broadband Engine Architecture (CBEA)- International Business Machines Corporation, Sony Computer Entertainment Incorporated, Toshiba Corporation—Aug. 8, 2005, which may be downloaded at http://cell.scei.co.jp/.
Advanced Multimedia Processing Lab—Electrical & Computer Engineering—which may be downloaded at http://amp.ece.cmu.edu/projects/FaceTracking/, downloaded on Aug. 24, 2007.
F. J. Huang and T. Chen, "Tracking of Multiple Faces for Human-Computer Interfaces and Virtual Environments", IEEE Intl. Conf. on Multimedia and Expo., New York, Jul. 2000.
Fdlib: face detection library—which may be downloaded at http://www.kyb.mpg.de/bs/people/kienzle/facedemo/facedemo.htm, downloaded on Aug. 24, 2007.
Kienzle, W., G. Bakir, M. Franz and B. Schölkopf: Face Detection—Efficient and Rank Deficient. Advances in Neural Information Processing Systems 17, 673-680. (Eds.) Weiss, Y. MIT Press, Cambridge, Ma, USA (2005).

* cited by examiner

*Primary Examiner* — Gevell Selby
(74) *Attorney, Agent, or Firm* — Joshua D. Isenberg; JDI Patent

(57) ABSTRACT

A method, apparatus and computer readable medium for use in photography are disclosed. A first electronic image analysis is performed on a potential image to determine whether any suitable subjects are within a frame of the potential image. If any suitable subjects are found in the frame, a second electronic image analysis is performed to determine whether the suitable subjects are in a predetermined position. The potential image is recorded if the second image analysis determines that the suitable subjects are in the predetermined position.

23 Claims, 3 Drawing Sheets

DIGITAL PHOTOGRAPHY USING ELECTRONIC IMAGE ANALYSIS TO IDENTIFY FACES OF FACES OF KNOWN SUBJECTS IN PREDETERMINED POSITION

FIELD OF THE INVENTION

Embodiments of the present invention are directed to photography and particularly to digital photography.

BACKGROUND OF THE INVENTION

Photography involves the recordation of visual images onto some form of tangible medium. Photography originally developed in the $19^{th}$ century based on a discovery that light could alter the properties of certain photosensitive chemical compounds and thereby record an image on a glass plate or flexible film treated with such compounds. In the $20^{th}$ century electronic image sensors were developed that allowed visual images to be recorded as electrical signals that could be stored on magnetic tape. Whether based on photosensitive chemicals or electronic image sensors, photography involves exposing an imaging mechanism to light for a sufficient period of time to record an image.

Developments in integrated circuit technology led to the development of digital image sensors and image processors small enough to be packaged a hand held cameras and even smaller devices such as cell phones. Such advances have resulted in the near ubiquity of digital cameras for photography. Digital cameras provide amateur and professional photographers with a variety of options for capturing and storing visual images.

One problem that has plagued photographers almost since the birth of photography in the $19^{th}$ century has been that of posing subjects, particularly living subjects. Living subjects tend to move of their own volition and are, therefore, difficult to pose, particularly where more than one living subject is to be photographed in a single frame. In the $19^{th}$ century, it was sometimes necessary to mechanically restrain a subject from moving during the relatively long exposure required for photographic plates in use at the time. Although the speed of photographic imaging mechanisms has improved vastly since the $19^{th}$ century, living subjects have not gotten significantly easier to pose.

A common frustration to photographers of human subjects has been that of getting every subject in the frame to face the camera, open their eyes and smile. A common practice in both amateur and professional photography is to ask the subjects to say "cheese" or something similar in order to get them to open their eyes, face the camera, and smile. Even with this precaution, multiple images must often be taken until all subjects in the frame are properly posed for a "perfect picture". This can be particularly wasteful of photochemical film since the film must be developed, and often the images must be printed, in order to determine whether or not they include a perfect picture. Digital photography techniques allow "imperfect" images to be discarded before printing. However, the recorded images must still be temporarily stored and reviewed to locate the properly posed image. For example, many digital cameras may operate in a so-called "burst" mode in which a number of pictures are recorded in rapid succession. The imperfect pictures may be discarded and the perfect pictures may be digitally saved in a memory stick or on a CD-ROM. Unfortunately, this technique has limitations, as to the length and number of pictures that can be taken due to the internal memory size of the camera and the transfer rate to external memory, for example, a burst mode of 2 seconds is typically not enough for posing of a group of people. Another problem is that in many cases, there is not a single "good" image amongst a plurality of images taken in "burst" mode.

Digital and non-digital cameras have used a "countdown" timer to allow a user of the camera to pose for a picture taken with his own camera. Although the use of such a timer allows the subjects a chance to pose, the actual recording of the image often comes as a surprise to at least some of the subjects, who are not properly positioned. One prior art attempt to address this problem, is to edit the photographs digitally after they are captured, e.g., using Photoshop from Adobe Systems Incorporated of San Jose, Calif. Another attempt to address the problem, known as MS Group shot from Microsoft Corporation of Redmond, Wash., marks different parts of different pictures and allows a user to merge them together offline to form the desired picture. Unfortunately, such image correction is not automated and requires manual editing of stored photographs. Furthermore, making "perfect" photographs from two or more "imperfect" photographs still requires storage of both the perfect and imperfect photographs. Such solutions deprive the photographer of a "real" photograph and instead make up an image of a scene that never existed.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention are directed to photographic, methods and computer readable media in which an image is not captured unless one or more subjects within the image are in a predetermined position. In a preferred embodiment a photographic apparatus is configured such that it won't capture an image until every suitable subject in the frame is looking at the camera, with their eyes open and smiling. Computer implemented algorithms for detecting such conditions exist. For example, the Sony T-100 camera includes software that allows detection of faces within an image. Such algorithms sometimes used to choose the focus object and the shutter parameter of the photograph. However, such algorithms are not known to be used to determine a priori whether to record an image.

As processors for digital cameras become more sophisticated the programming available for such processors can take on added functionality. Additional software exists that allows for recognition of faces, i.e., association of faces with known individuals. However, such software is not known to have been used proactively in determining whether or not to record a photographic image.

Embodiments of the present invention combine the capabilities of these algorithms into a mode of camera operation in which a camera records an image when all suitable subjects are in a desired predetermined position. This mode of operation may supplement or even replace the "countdown" timer used on virtually all digital cameras and fix those cases where it is difficult to catch every subject in a desired pose.

Figure 1:
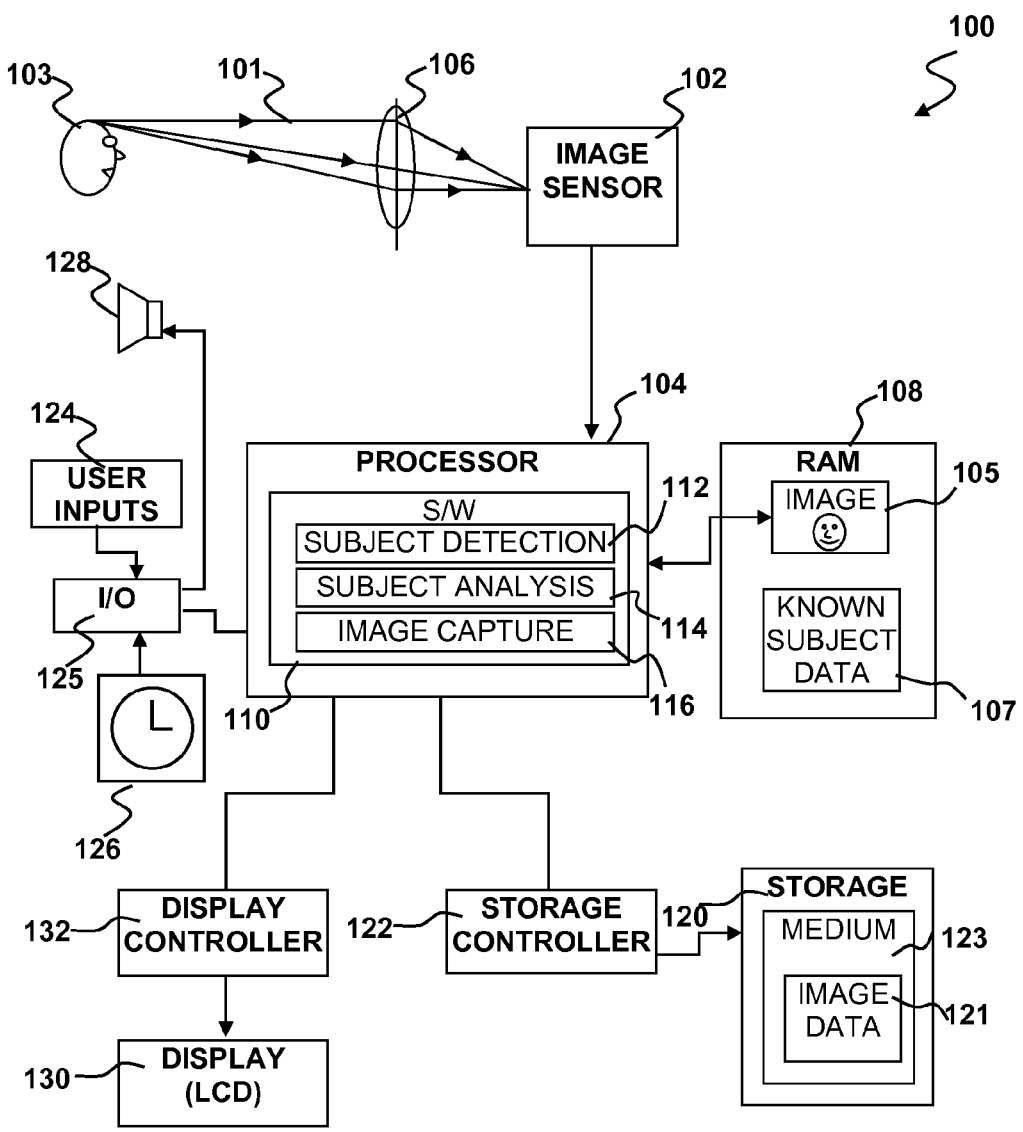
FIG. 1 is a schematic diagram illustrating a photographic apparatus according to an embodiment of the present invention.

FIG. 1 depicts and example of a photographic apparatus 100 according to an embodiment of the present invention. The apparatus 100 generally includes an image sensor 102 coupled to a computer processor 104. One or more optical elements 106 optically coupled to the image sensor 102. The one or more optical elements 106, e.g., one or more lenses, optical filters, polarizers and the like, may be configured to image light 101 from a subject 103 onto the image sensor 102. The image sensor 102 may contain a plurality of light-sensing elements corresponding to different pixels of an image 105. Each light sensing element may produce electronic signals that depend on the intensity and frequency of light that makes up the pixel. By way of example, the image sensor may be based on an array of complementary metal-oxide-semiconductor (CMOS) or charged coupled device (CCD) sensor elements. The signals that make up the image 105 may be temporarily stored in electronic form in a memory 108 coupled to the image sensor 102 and/or processor 104. The memory 108 may be some form of computer memory, which may be a volatile memory, such as random access memory (RAM), including static RAM (SRAM) or dynamic RAM (DRAM), or non-volatile memory such as flash memory.

The processor 104 may be a single-core or multi-core processor. Furthermore, in embodiments of the present invention, the system 100 may include more than one processor. By way of example, and without loss of generality, the processor 104 may be a Bionz® image processor from Sony Corporation of Tokyo, Japan. Alternatively, the processor 104 may be a cell processor. A detailed description of a particular example of a cell processor architecture known as Cell Broadband Engine Architecture (CBEA) is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.sce-i.co.jp/, the entire contents of which are incorporated herein by reference.

The apparatus 100 may be configured to record images, e.g., by sending the images to a storage device 120, which may be part of the apparatus 100 or a standalone unit that is separate or detachable from it. Images to be stored may be compressed for storage as image data 121, e.g., by a storage controller 122, which may be part of the apparatus 100 or part of the storage device 120 or separate from both. By way of example, the storage device 120 may include a CD-ROM read/write drive, digital video disk (DVD) read/write drive, hard disk, Micro drive, flash memory drive, tape drive and the like. The storage device 120 may record the image data 121 on a storage medium 123, e.g., a CD-ROM or flash memory. It is noted that for the purposes of this application, the storage medium 123 may be regarded as being separate from the storage device 120, particularly, where the storage medium 120 is designed to be readily removable from the storage device, e.g., as in the case of a CD-ROM, DVD-ROM, flash memory "stick", hard disk, micro disk, magnetic tape, and the like.

The apparatus 100 may further include user inputs 124, e.g., buttons, switches, keypads, voice recognition systems, touch screens and the like. The inputs 124 may be coupled to the processor 104, e.g., through an input/output controller 125. The apparatus 100 may further include a clock 126 and a notification device 128. The clock 126 may be implemented as a digital circuit for timing of events. The notification device 128 may provide audible and/or visible and/or tactile signals to a user to indicate that some condition exists.

The apparatus 100 may optionally include a display 130, e.g., a flat panel display such as a liquid crystal display (LCD). The display 130 may display images such as the potential image 105 or images stored in the storage medium 123. A display controller 132 may be coupled between the processor 104 and the display 130 to facilitate display of images from the image sensor 102, memory 108 or storage medium 123. The storage controller 122 may be configured to decompress stored image data 121 and the display controller 132 may utilize the resulting decompressed image data to display a stored image.

In embodiments of the present invention, the processor 104 may be configured to pre-select images for recording from amongst one or more potential images. As used herein, the term "potential image" refers to an image that has been detected by the image sensor 102, but not yet recorded, e.g., on the storage device 120. The term potential image includes images 105 stored in the memory 108 prior to recording the image with the storage device.

The processor 104 may be programmed with suitably configured software 110. The software 110 may be in any suitable programming language, e.g., Java, C/C++, MatLab and the like. Instructions making up portions of the software 110 may be loaded into registers on the processor 104 for execution. Data manipulated by the software 110 may also be loaded into registers on the processor 104. The software 110 may include subject detection instructions 112, subject analysis instructions 114 and image capture instructions 116. The subject detection instructions 112 are configured such that, when executed they cause the processor 104 to perform a first electronic image analysis on a potential image from the image sensor 102 to determine whether any suitable subjects are within a frame of the potential image. The subject detection instructions 112 may iteratively repeat until one or more subjects are detected.

If any suitable subjects are found in the frame, the subject analysis instructions 114, when executed, may cause the processor 104 to perform a second electronic image analysis on the potential image to determine whether the suitable subjects are in a predetermined position. Otherwise, the subject detection instructions 112 and/or the subject analysis instructions 114 may be iteratively repeated until subjects are found in the frame and determined to be in the predetermined position. If the second image analysis determines that the suitable subjects are in the predetermined position, the image capture instructions 116, when executed, may cause the processor 104 record the potential image 105 using the storage device 120 coupled to the processor. Otherwise the subject detection instructions 112 and/or subject analysis instructions 114 and/or image capture instructions 116 may be repeated until an image has been captured.

The predetermined position, referred to above, may be any desirable pose for a subject of a photograph. In the case of living subject, the predetermined position may be one in which the subject is facing the camera. In addition, the predetermined position may be one in which the subject is smiling. Furthermore, the predetermined position may be one in which the subject's eyes are open. There are numerous variations on the predetermined position that are within the scope of embodiments of the present invention.

In some embodiments, the subject analysis instructions 114 may include face tracking software to detect predetermined positions involving a subject's face, e.g., where a subject is smiling, facing a camera, with eyes. An example of a face tracking software is described at http://amp.ece.cmu.edu/projects/FaceTracking/, the disclosures of which are incorporated herein by reference. Further detail regarding such face tracking may be found in F. J. Huang and T. Chen, "Tracking of Multiple Faces for Human-Computer Interfaces and Virtual Environments", IEEE Intl. Conf. on Multimedia and Expo., New York, July 2000, the disclosures of which are incorporated herein by reference.

In some embodiments, a user may be able to customize the predetermined position. For example, a user may store known subject data 107 in the memory 108. The known subject data 107 may be derived from one or more reference images of subjects known to be in the predetermined position. The subject analysis instructions 114 may then compare potential images 105 against the known subject data 107.

Figure 2:
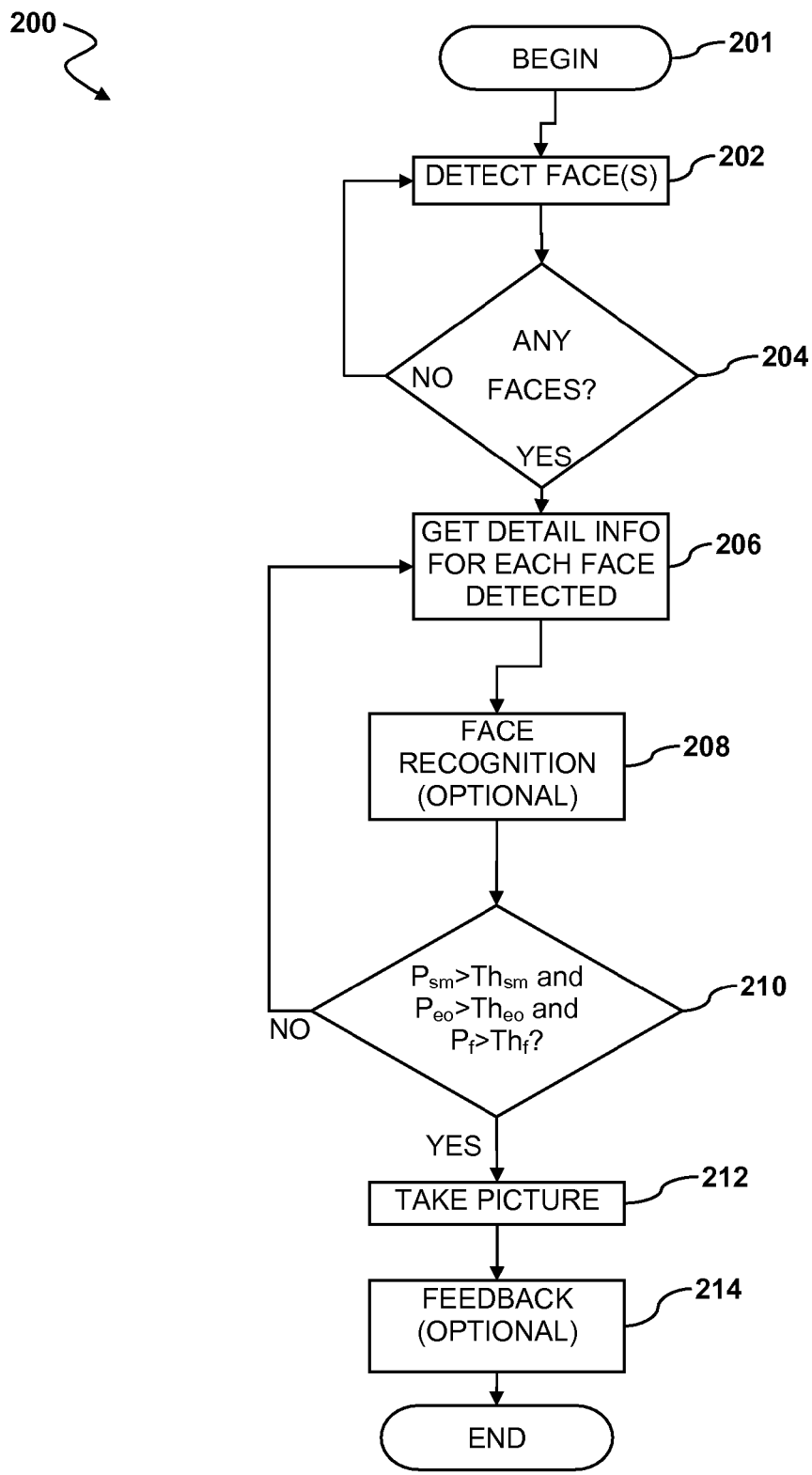
FIG. 2 is a schematic diagram illustrating a photographic method according to an embodiment of the present invention.

An embodiment of the invention may be understood by considering the example of a method 200 as shown in FIG. 2. The method may be implemented with the apparatus 100. The method 200 begins at 201. By way of example, a user may initiate the method 200 with the system 100 through an appropriate command entered with one of the user inputs 124. At 202 the system 100 may then begin detecting whether a potential image detected by the sensor 102 contains any faces. By way of example, and without loss of generality, the subject detection instructions 112 may include facial detection software that tracks the nose, mouth and eyes of a subject 103 in a portion of an image 105. By way of example, face detection may be implemented using a software library such as fdlib, which is described at http://www.kyb.mpg.de/bs/people/kienzle/facedemo/facedemo.htm, the disclosures of which are incorporated herein by reference. Further details of face detection as implemented by fdlib may be found in "Face Detection—Efficient and Rank Deficient", by Kienzle, W., G. Bakir, M. Franz and B. Schölkopf, in *Advances in Neural Information Processing Systems* 17, 673-680. (Eds.) Weiss, Y. MIT Press, Cambridge, Mass., USA (2005), which is incorporated herein by reference.

The positions of the nose, mouth and eyes may then be compared to a three-dimensional (3D) model of a face to find the position of the face in 3D space. The 3D face position may then be applied to a two-dimensional image space to find the locations of the eyes, nose and mouth in the image. The subject detection instructions 112 may then compare the relative positions of the eyes, nose and mouth to determine if they are associated with a face. This process may be repeated for other portions of the image 105 to determine of they contain any faces. By way of example, the subject detection instructions 112 may be configured to detect faces through a series of comparisons of different pixels within a portion of a potential image. Such comparisons may include, e.g., a simple subtraction of intensity values for different pairs of pixels in the images. By analyzing the pattern of intensity difference values, the subject detection instructions 112 may determine whether one or more faces are present in the potential image.

The subject detection instructions 112 may compute a probability $P_f$ that a subject is facing in the proper direction (e.g., facing the camera). Alternatively, the subject analysis instructions 114 may compute the probability $P_f$ that a subject is facing in the proper direction, e.g., by estimating the angle of the subject's head relative to the plane of the potential image 105.

If at 204, any faces have been detected then, then the subject analysis instructions 114 may be invoked for each face detected. Alternatively, the method may return to the subject detection instructions 112. By way of example and without loss of generality, the subject analysis instructions 114 may analyze portions of the potential image 105 to obtain detailed information for each face detected as indicated at 206.

In some embodiments, but not all, the subject analysis instructions 114 may implement face recognition, as indicated at 208. As used herein, face recognition, refers to the process of comparing a portion of an image or potential image containing a subject's face with information derived from a known face. The comparison may be implemented by deriving information from the face or faces in the potential image 105 and comparing that information to information similarly derived from an image of a known face. Such information may include Gabor features. A Gabor filter is a linear filter whose impulse response is defined by a harmonic function multiplied by a Gaussian function. Because of the multiplication-convolution property (Convolution theorem), the Fourier transform of a Gabor filter's impulse response is the convolution of the Fourier transform of the harmonic function and the Fourier transform of the Gaussian function.

$$g(x, y; \lambda, \theta, \psi, \sigma, \gamma) = \exp\left(\frac{x'^2 + \gamma^2 y'^2}{2\sigma^2}\right)\cos\left(2\pi\frac{x'}{\lambda} + \psi\right)$$

where $x' = x \cos\theta + y \sin\theta$ and $y' = -x \sin\theta + y \cos\theta$.

In the equations above, $\lambda$ represents the wavelength of the cosine factor, $\theta$ represents the orientation of the normal to the parallel stripes of a Gabor function, $\Psi$ is the phase offset, and $\gamma$ is the spatial aspect ratio, and specifies the ellipticity of the support of the Gabor function. By way of example, a filter bank consisting of Gabor filters with various scales and rotations may be created. The filters may be convolved with a signal representing an image or potential image, resulting in a so-called Gabor space. This process is closely related to processes in the primary visual cortex. Relations between activations for specific spatial locations are very distinctive between objects in an image. These relations may be stored for one or more known subjects as part of the known subject data 107 and used to determine whether a subject in a potential image is the same as a known subject.

It is also noted that Gabor filtering may also be used to determine whether a subject is in the predetermined position, e.g., facing the camera, smiling, with eyes open or some combination of two or more of these three.

In the case where the predetermined position is one where the subject 103 is smiling, the subject analysis instructions 114 may be configured to detect a smile with in the potential image 105 or a suitable portion thereof. Some existing analysis software may be capable of detecting a smile in a 96 pixel by 96 pixel portion of an image.

To detect a smile, the subject analysis instructions 114 may implement trained neural network software configured to determine if the mouth of a detected face is straight or smiling. Such neural network software may be trained with images in which a subject is known to be either smiling or not smiling. The subject analysis instructions 114 may compute a probability that the subject is smiling $P_{sm}$.

In a case where the predetermined position is one in which the subject 103 has his or her eyes open, the subject analysis instructions 114 may analyze the intensity differences referred to above. The intensity differences for pixels corresponding to the subjects eyes may have a characteristic pattern when the subject's eyes are open that is distinctly different from when the subject's eyes are closed. The subject analysis instructions 114 may compute a probability $P_{eo}$ that the subject's eyes are open based on an analysis of the pixel intensity differences. Gabor filtering may also be used to determine the probability $P_{eo}$ that a subject's eyes are open.

Once the subject detection instructions 112 have detected one or more suitable subjects and the subject analysis instructions 114 have identified, the image capture instructions 116 may be invoked. By way of example, the image capture instructions 116 may compare the calculated probabilities $P_f$, $P_{sm}$ and $P_{eo}$ to corresponding predetermined threshold probabilities $Th_f$, $Th_{sm}$ and $Th_{eo}$ as indicated at 210. If each calculated probability $P_f$, $P_{sm}$, $P_{eo}$ is greater than the corresponding threshold probability then the processor 102 may trigger the normal sequence for recording the potential image 105 as indicated at 212. For example, the potential image 105 may be copied to the storage controller 122 which may convert the image to a digital format suitable storage with the storage device 120. The converting process may involve digitally compressing the potential image 105 so that it takes up less memory space. Alternatively, the image may be recorded photo-chemically, e.g., by optically directing the image 105 from an electronic image sensor to a photographic film.

Once the image has been recorded, the system 100 may provide a signal to the user indicating that this has been done, as indicated at 214. For example, the processor may trigger the notification device 128 to provide a signal to the user. The nature of the signal is largely dependent on the type of notification device. For example, an audio device, such as a speaker and sound synthesizer may produce a distinct audible "beep" or tone to indicate that the image has been successfully recorded. Alternatively, a light emitting diode (LED) may light up or flash on and off, or a visual device, e.g., a flat screen display, or alphanumeric readout may present a text or symbolic message.

There are many possible variations on the embodiments described above. For example, according to an alternative embodiment, the subject analysis instructions 114 may be configured to buffer a plurality of images, e.g., by storing them temporarily in the memory 108, and analyze the plurality of images to determine whether any of the images of the plurality include one or more suitable subjects in the predetermined position. In such an embodiment, the image capture instructions 116 may be configured to record one or more images of the plurality for which one or more suitable subjects are determined by the subject analysis instructions 114 to be in the predetermined position. This embodiment allows the apparatus 100 to implement filter out undesirable images when pictures are taken in a so-called "burst" mode, e.g., a plurality of images are automatically captured in rapid succession. Buffering a plurality of images and filtering out the undesirable images, e.g., based on the predetermined position, and storing only the desirable ones avoids problems normally associated with burst mode photography. Specifically, fewer images need to be stored, which frees up space in the storage medium 123. Such image filtering may be particularly useful when a relatively large number of images are taken in a short period of time but only a few have the subjects in the desirable position.

It is noted that the discussion above refers to "suitable" subjects. In general, a suitable subject one for which photography is appropriate based on some criteria. Suitability may be determined based on any number of criteria. For example, a subject may not be suitable if too far away or too poorly illuminated to be analyzed. It is noted that in some embodiments, subjects within an image may not be suitable, even if they are in the predetermined position. For example, as discussed above, in some embodiments, the subject analysis instructions 114 may be configured to recognize known faces. Such a capability may be leveraged to provide further features. For example, when a photograph includes both known and unknown subjects, face recognition in conjunction with the subject analysis instructions 114 to limit detection of the predetermined position to those subjects that are recognized, e.g., pre-registered using face recognition. For example, in the case in which a group of known subjects are photographed in front of a crowd containing other unknown subjects, it may be desirable to ignore the unknown subjects and wait only for the known subjects to face the camera, smile and open their eyes. The subject analysis instructions 114 may be configured to ignore the other unknown subjects in the potential image. In addition, the image capture instructions 116 may be configured to set focus depth for the potential image 105 based on the locations of one or more known subjects, e.g., by focusing on known faces. This mode of operation may be initiated, e.g., through suitable use of the user inputs 124.

Figure 3A:
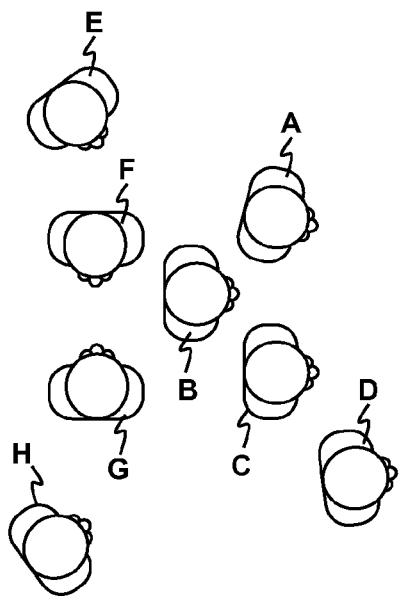
FIG. 3A is a top view diagram illustrating an apparatus according to an embodiment of the invention capturing an image of one or more subjects at different depths.
Figure 3A:
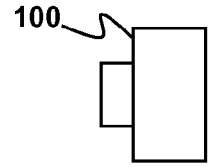
Figure 3B:
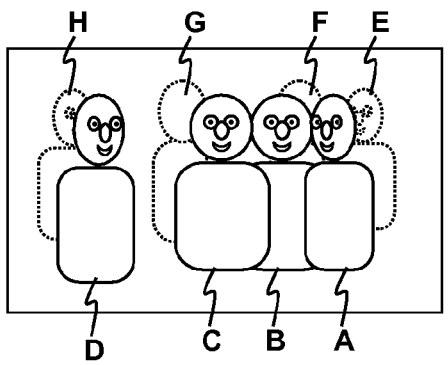
FIGS. 3B-3E are examples of different images of the scene in FIG. 3A illustrating focusing at different depths for different subjects according to an embodiment of the present invention.
Figure 3C:
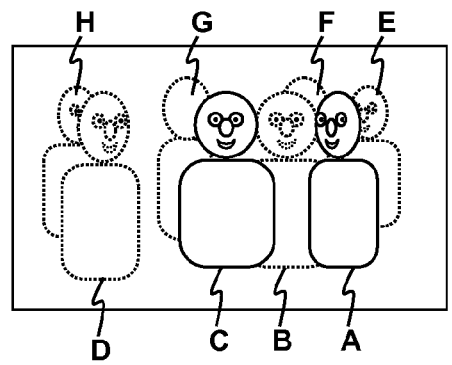
Figure 3D:
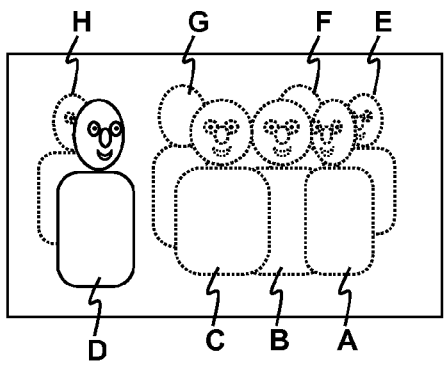
Figure 3E:
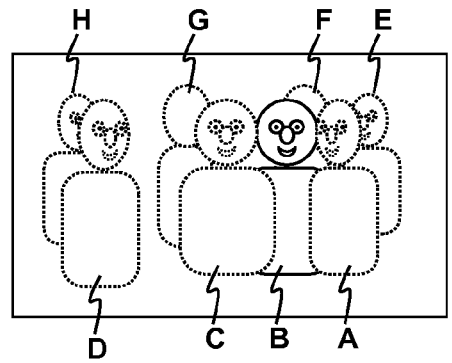

In another alternative embodiment face recognition may be combined with selective focusing in a mode referred to herein as "round-robin". In this embodiment, the image capture instructions 116 may be configured to record a plurality of potential images at different depths of focus. The depth of focus for each image may be dependent on a depth of focus for a different known subject in the image. This embodiment may be understood by referring to FIGS. 3A-3E. As seen in FIG. 3A, the apparatus 100 may be used to photograph a crowd containing known subjects A, B, C, D and unknown subjects E, F, G and H. In this example, subjects A, B, C and D are in the predetermined position, e.g., smiling, facing the camera with their eyes open. Subject D is closest to the apparatus 100 and subject B is furthest away. Subjects A and C are at the same depth of focus intermediate the focus depths for subject B and subject D. The subject analysis instructions 114 may identify subjects A, B, C and D as known subjects, e.g., from an analysis of their facial features. In the round-robin mode, four images may be taken in rapid succession with different focus depth settings for each image. As seen from the first image, illustrated in FIG. 3B, the image capture instructions 116 may select best focus depth for capturing all four suitable subjects A, B, C, D. Note that unknown subjects E, F, G, and H may be out of focus. As seen from the second image, illustrated in FIG. 3C, the image capture instructions 116 may select best focus depth for capturing subjects A and C. Subjects B, D, E, F, G, and H may be out of focus. As seen from the third image, illustrated in FIG. 3D, the image capture instructions 116 may select best focus depth for capturing subject D. Subjects A, B, C, E, F, G, and H may be out of focus. Finally, as seen from the fourth image, illustrated in FIG. 3E, the image capture instructions 116 may select best focus depth for capturing subject B. Subjects A, C, D, E, F, G, and H may be out of focus. In alternative embodiments, the "round-robin" mode may be implemented for plural subjects in the predetermined position independent of whether any subject is known or unknown.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for photography, comprising:
a) performing a first electronic image analysis on a potential image to determine whether any suitable subjects are within a frame of the potential image;
b) if any suitable subjects are found in the frame, performing a second electronic image analysis on the potential image to determine whether the suitable subjects are in a predetermined position, otherwise repeating a) and b); and
c) recording the potential image if the second image analysis determines that the suitable subjects are in the predetermined position, otherwise repeating a), b) and c), wherein a) or b) includes analyzing portions of the frame corresponding to faces of one or more subjects in the frame and determining from analysis of the portions corresponding to faces whether any face of any subject in the frame corresponds a known face of a known subject.

2. The method of claim 1 wherein the predetermined position is one in which a suitable subject is facing the camera.

3. The method of claim 2 wherein the predetermined position is one in which the suitable subject is smiling and/or the suitable subject's eyes are open.

4. The method of claim 1 wherein b) includes buffering a plurality of images and wherein performing the second electronic image analysis includes analyzing the plurality of images to determine whether any of the images of the plurality include one or more suitable subjects in the predetermined position, and wherein c) includes recording one or more images of the plurality for which one or more suitable subjects are determined at b) in the predetermined position.

5. The method of claim 1 wherein c) includes recording the potential image only if the second image analysis determines that the suitable subjects are in the predetermined position.

6. The method of claim 1 wherein determining whether any subjects in the frame correspond to one or more known subjects includes comparing facial features of a subject in the potential image with facial features of one or more of the known subjects.

7. The method of claim 1 wherein c) includes recording the potential image if the second image analysis determines that one or more known subjects in the potential image are in the predetermined position.

8. The method of claim 1 wherein c) includes recording a plurality of potential images at different depths of focus, wherein the depth of focus for each image is dependent on a depth of focus for a different known subject in the image, wherein the plurality of different depths of focus are selected such that only one or more known subjects are in focus in each potential image and unknown subjects are out of focus.

9. The method of claim 1 wherein c) includes recording a plurality of potential images at different depths of focus, wherein the depth of focus for each image is dependent on a depth of focus for a different suitable subject in the predetermined position.

10. The method of claim 1, further comprising:
d) notifying a user if an image has been recorded at c).

11. A photographic apparatus, comprising:
an image sensor;
one or more optical elements optically coupled to the image sensor, the one or more optical elements being configured to image light from a subject onto the image sensor; and:
a computer processor coupled to the image sensor; wherein the processor is programmed with instructions including:
a) a first set of instructions that, when executed causes the processor to perform a first electronic image analysis on a potential image from the image sensor to determine whether any suitable subjects are within a frame of the potential image;
b) a second set of instructions that, when executed causes the processor perform a second electronic image analysis on the potential image to determine whether the suitable subjects are in a predetermined position, if any suitable subjects are found in the frame, or otherwise repeat a) and b); and
c) a third set of instructions that, when executed causes the processor record the potential image in an image storage medium coupled to the processor if the second image analysis determines that the suitable subjects are in the predetermined position, or otherwise repeat a), b) and c), wherein a) or b) includes analyzing portions of the frame corresponding to faces of one or more subjects in the frame and determining from analysis of the portions corresponding to faces whether any face of any subject in the frame corresponds to a known face of a known subject.

12. The apparatus of claim 11 wherein the predetermined position is one in which a suitable subject is facing the camera.

13. The apparatus of claim 12 wherein the predetermined position is one in which the suitable subject is smiling and/or the suitable subject's eyes are open.

14. The apparatus of claim 11, further comprising a memory coupled to the processor and/or image sensor.

15. The apparatus of claim 14 wherein the first, second or third set of instructions includes one or more instructions that, when executed, cause the processor to store temporarily the potential image in the memory.

16. The apparatus of claim 14 wherein the second set of instructions includes one or more instructions that, when executed, cause the processor buffer a plurality of images in the memory and analyze the plurality of images to determine whether any of the images of the plurality include one or more suitable subjects in the predetermined position.

17. The apparatus of claim 16 wherein the third set of instructions includes one or more instructions that, when executed, cause the processor to record in the storage medium one or more images of the plurality for which one or more suitable subjects are determined by execution of the second set of instructions to be in the predetermined position.

18. The apparatus of claim 11 wherein the third set of instructions includes one or more instructions that, when executed override an authorization to record the potential image if the second image analysis determines that the suitable subjects are not in the predetermined position.

19. The apparatus of claim 11 wherein the first or second sets of instructions include one or more instructions that, when executed, determine whether any subjects in the frame correspond to one or more known subjects includes comparing facial features of a subject in the potential image with facial features of one or more of the known subjects.

20. The apparatus of claim 11 wherein the third set of instructions includes one or more instructions that, when executed, store the potential image if the second image analysis determines that one or more known subjects in the potential image are in the predetermined position.

21. The apparatus of claim 11 wherein the third set of instructions includes one or more instructions that, when executed record a plurality of potential images at different depths of focus, wherein the depth of focus for each image is dependent on a depth of focus for a different known subject in the image, wherein the plurality of different depths of focus are selected such that only one or more known subjects are in focus in each potential image and unknown subjects are out of focus.

22. The apparatus of claim 11 wherein the third set of instructions includes one or more instructions that, when executed record a plurality of potential images at different depths of focus, wherein the depth of focus for each image is dependent on a depth of focus for a different suitable subject in the predetermined position.

23. A non-transitory computer readable medium having computer executable instructions embodied therein, the computer executable instructions including:
  a) a first set of instructions that, when executed causes a processor to perform a first electronic image analysis on a potential image from an image sensor to determine whether any suitable subjects are within a frame of the potential image;
  b) a second set of instructions that, when executed causes the processor perform a second electronic image analysis on the potential image to determine whether the suitable subjects are in a predetermined position, if any suitable subjects are found in the frame, or otherwise repeat a) and b); and
  c) a third set of instructions that, when executed causes the processor record the potential image in an image storage medium coupled to the processor if the second image analysis determines that the suitable subjects are in the predetermined position, or otherwise repeat a), b) and c), wherein a) or b) includes analyzing portions of the frame corresponding to faces of one or more subjects in the frame and determining from analysis of the portions corresponding to faces whether any face of any subject in the frame corresponds to a known face of a known subject.

* * * * *